United States Patent
Zheng et al.

(10) Patent No.: US 12,222,839 B2
(45) Date of Patent: Feb. 11, 2025

(54) SERVICE INTERACTION VIOLATION DETECTION

(71) Applicant: Stripe, Inc., South San Francisco, CA (US)

(72) Inventors: Sydney Zheng, Berkeley, CA (US); Soam Vasani, Belmont, CA (US)

(73) Assignee: Stripe, Inc., South San Francisco, CA (US)

(*) Notice: Subject to any disclaimer, the term of this patent is extended or adjusted under 35 U.S.C. 154(b) by 226 days.

(21) Appl. No.: 17/873,833

(22) Filed: Jul. 26, 2022

(65) Prior Publication Data
US 2024/0037011 A1    Feb. 1, 2024

(51) Int. Cl.
*G06F 9/44*    (2018.01)
*G06F 9/445*   (2018.01)
*G06F 9/455*   (2018.01)
*G06F 11/36*   (2006.01)
*G06N 20/00*   (2019.01)

(52) U.S. Cl.
CPC ...... *G06F 11/3608* (2013.01); *G06F 11/3664* (2013.01); *G06N 20/00* (2019.01)

(58) Field of Classification Search
CPC .... G06F 11/3608; G06F 11/3664; G06F 8/20; G06F 8/427; G06F 8/43; G06N 20/00
See application file for complete search history.

(56) References Cited

U.S. PATENT DOCUMENTS

| | | | |
|---|---|---|---|
| 10,182,129 B1 * | 1/2019 | Peterson | H04L 41/0823 |
| 11,714,823 B1 * | 8/2023 | Breeden | G06F 16/24556 707/602 |
| 11,734,419 B1 * | 8/2023 | Mackle | G06F 9/451 726/22 |
| 11,914,993 B1 * | 2/2024 | Garg | G06N 20/00 |

(Continued)

FOREIGN PATENT DOCUMENTS

WO    WO-2022087510 A1 *    4/2022    ............. G06F 21/34

OTHER PUBLICATIONS

Biplob Debnath, LogLens: A Real-time Log Analysis System, 2018, pp. 1052-1061. https://ieeexplore.ieee.org/stamp/stamp.jsp?tp=&arnumber=8416368 (Year: 2018).*

(Continued)

*Primary Examiner* — Mongbao Nguyen
(74) *Attorney, Agent, or Firm* — Foley & Lardner LLP

(57) ABSTRACT

In an example embodiment, interactions among services in a service proxy are recorded in an interaction log. A service graph manager then parses the interaction log. The service graph manager reads each interaction and then processes the interaction to determine if it violates the rules. If so, the service graph manager reports the violation to the software developer and also recommends an action to remedy the violation. In an example embodiment, this recommendation takes the form of an indication of which files to modify to allow the service interaction (e.g., which rule(s) to modify to ensure that the service interaction is not a violation). The software developer can then approve the proposed action, (Continued)

which can then be automatically implemented to ensure that once the service is sent to a quality assurance environment there will be no rules violation from the corresponding interaction(s).

10 Claims, 5 Drawing Sheets

(56) References Cited

U.S. PATENT DOCUMENTS

| | | | |
|---|---|---|---|
| 2019/0050319 A1* | 2/2019 | Gondalia | G06F 11/3664 |
| 2020/0287927 A1* | 9/2020 | Zadeh | H04L 43/08 |
| 2021/0081308 A1* | 3/2021 | Golubev | G06F 11/3688 |
| 2021/0117425 A1* | 4/2021 | Rao | H04L 41/0806 |
| 2022/0171662 A1* | 6/2022 | Zhan | G06F 9/5083 |
| 2022/0182296 A1* | 6/2022 | Dwivedi | H04L 41/5006 |
| 2022/0222047 A1* | 7/2022 | Todirel | G06F 8/70 |
| 2023/0259342 A1* | 8/2023 | Jhanwar | G06F 8/60 717/121 |
| 2024/0007492 A1* | 1/2024 | Shen | H04L 63/1425 |

OTHER PUBLICATIONS

Hawraa Abdulameer Subeh, A Learning Classifier System for Detection of Service-Level Agreement Violations in Business Process, 2021, pp. 1-6. https://ieeexplore.ieee.org/stamp/stamp.jsp?tp=&arnumber=9773515 (Year: 2021).*

Miroslaw Ochodek, Recognizing lines of code violating company-specific coding guidelines using machine learning, 2020, pp. 220-. 262. https://link.springer.com/article/10.1007/s10664-019-09769-8 <br> (Year: 2020).*

Thomas Andrew, (WO 2022087510 A1), 2022, pp. 1-64. (Year: 2022).*

* cited by examiner

SERVICE INTERACTION VIOLATION DETECTION

TECHNICAL FIELD

The subject matter disclosed herein generally relates to software services. More specifically, the present application relates to software service interaction violation detection.

BACKGROUND

In computer software, a service is software that performs automated tasks, responds to hardware and network events, or listens for data requests from other software. It is common for many services to be operating in a single network architecture. These services can interact with each other in various ways that have been designed by their respective software developers.

Software development often uses tools that provide various different environments. A development environment is where the software developer actually creates the code that implements the desired functionality of the software, including the interactions performed to and from the developed service. A quality assurance (QA) environment is where the developed service can be tested to identify and remove bugs. A production environment is where the developed service gets put on a live server.

While each service has a rule-set of services that it can receive requests from or send request to, often such rule-sets are not applied to the development environment. This is because development environments typically want to reduce friction while developers are programming new service interactions. The result, however, is that developers are unaware of a potential service interaction violation until the developed service is moved to the QA environment.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, a software tool is provided, called a service graph manager, that monitors service interactions on a developer machine (devbox), warns software developers of rule violations, and suggests changes to the rules to allow these interactions, which can then be applied automatically.

Figure 1:
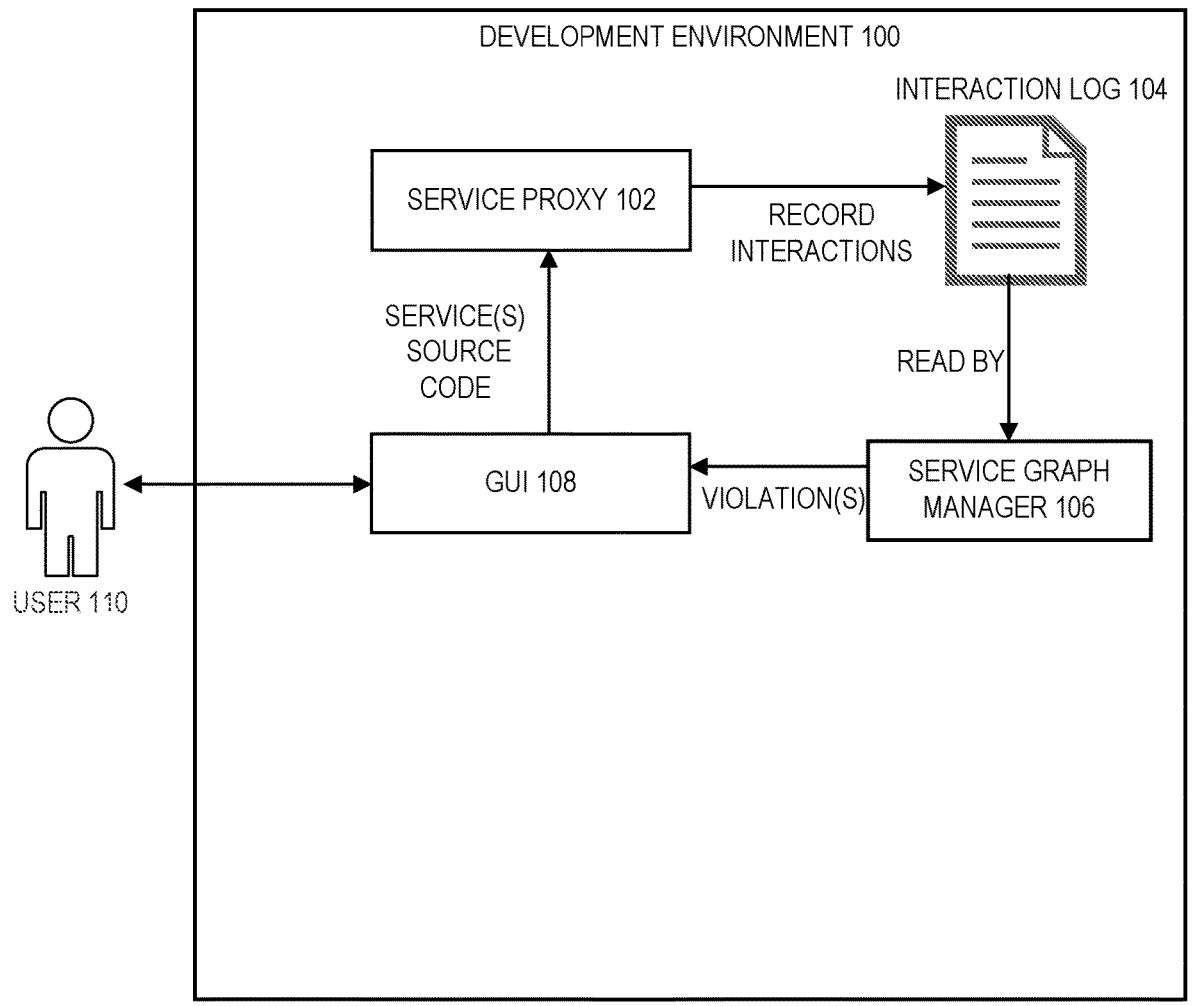
FIG. 1 is a block diagram illustrating a development environment in accordance with some example embodiments.

FIG. 1 is a block diagram illustrating a development environment 100 in accordance with an example embodiment. A service proxy 102 provides the ability to abstract a network by providing common features. Essentially, despite being in a development environment, a service created by a software developer is able to be tested with other services on the network, since all the services are abstracted. As mentioned earlier, since this is all occurring in a development environment 100, there are no interactions between services that are blocked, even if they would normally have been blocked (e.g., they cause a security violation). In an example embodiment, the service proxy 102 is implemented as a distributed proxy with a communication bus and universal data plane designed for service mesh architectures.

In an example embodiment, interactions among services in the service proxy 102 are recorded in an interaction log 104. A service graph manager 106 then parses the interaction log 104. It reads each interaction then processes the interaction to determine if it is a violation of the rules. If so, then it reports the violation to the software developer and also recommends an action to remedy the violation. In an example embodiment, this recommendation takes the form of an indication of which files to modify to allow the service interaction (e.g., which rule(s) to modify to ensure that the service interaction is not a violation). The software developer can then approve the proposed action, which can then be automatically implemented to ensure that once the service is sent to the QA environment that there will be no rules violation from the corresponding interaction(s). A Graphical User Interface (GUI) 108 is used by a user 110, such as software developer, to submit source code to the development environment 100 and to receive visual indications of violations in the source code.

Figure 2:
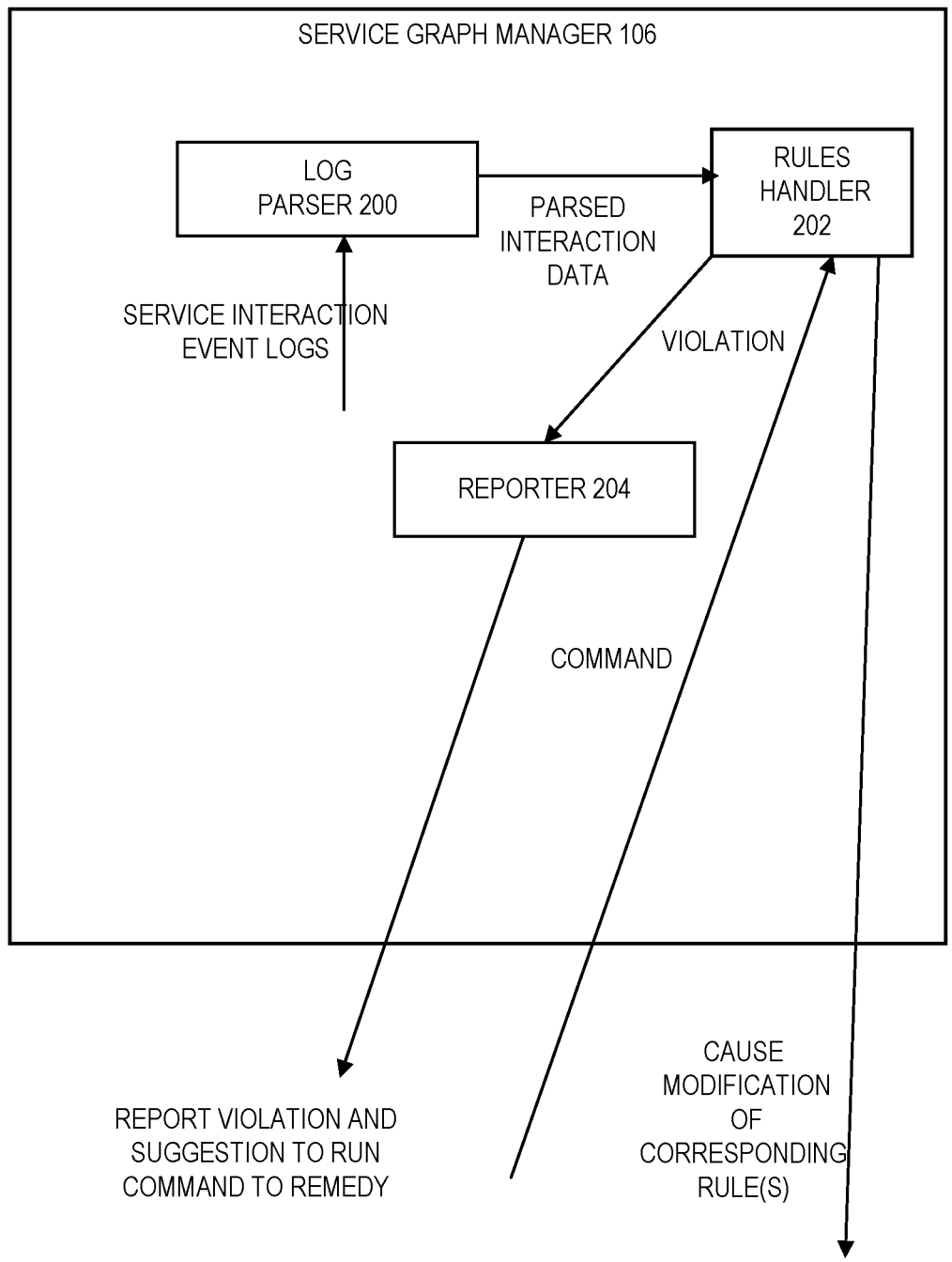
FIG. 2 is a block diagram illustrating the service graph manager of FIG. 1 in more detail, in accordance with some example embodiments.

FIG. 2 is a block diagram illustrating the service graph manager 106 of FIG. 1 in more detail, in accordance with an example embodiment. The service graph manager 106 includes a log parser 200, a rules handler 202, and a reporter 204. The interaction log 104 from FIG. 1 stores various pieces of data about each interaction, and the log parser 200 then extracts the relevant pieces of data for each interaction (rather than using all the data). Below is an example of a single line from such an interaction log 104: {"routeName": null,"requestID":"xxx-xxx","responseFlags":"-", "forwardedFor":"XX.XXX.XX.XXX","grpcStatus":null,"serverDEFService":" ser vice-b","ABCID": null,"userAgent": "grpcurl/v1.8.0 grpc-go/1.30.0","methodGHIOriginalPathProtocol":"POST /grpc.reflection.v1alpha.ServerReflection/ServerReflectionInfo HTTP/2","bytesSent":206,"trailerGrpcStatus":"0", "upstreamHost":"XX.XXX.XX.X XX:XXXX","ABCTag": "[NOABC]","duration":31,"authority":"host-type-a", "GHIUpstreamServiceTime": null,"clientDEFService": "service-a","bytesReceived":8,"startTime":"2022-05-20T16:41:21.546Z","responseCode":200}

One technical problem that is encountered is that tracking all interactions can take up memory, to the point that memory may be full or at least be so full that it begins to negatively impact performance. As such, in an example embodiment, the log parser 200 may take steps to reduce the number of interactions that it actually keeps the parsed data for. One way this can be performed is by including graph truncating functionality within the log parser 200. More particularly, an interaction graph may be either obtained or created, with each service being a node in the graph and each edge between nodes being an interaction between two services. The graph truncating functionality may be utilized in a manner to reduce the amount of interactions stored in this graph. The truncated graph may then be used alongside the parsed interaction data to create a data set of only relevant interaction data.

One way this graph truncating functionality may operate is on the basis that the number of times a particular interaction has occurred is not really relevant, but the timing of when the interaction has occurred can be relevant, and more particularly how recently the interaction has occurred. Thus, for example, it may not be relevant that a particular interaction between service A and service B occurred 100 times, but it is relevant as to whether the last time that particular interaction occurred was an hour ago versus a week ago. The interaction may not be relevant at all if it last occurred a week ago, while the interaction may be relevant if it last occurred an hour ago. Thus, the graph truncating functionality acts to perform two operations for a particular interaction between two services: (1) eliminate duplicate interactions, saving only the most recent of that particular interaction between two services, while saving a timestamp or other time indicator, for the particular interaction, conveying when the most recent of the particular interaction occurred; and (2) eliminating older interactions. Eliminating older interactions may be accomplished by filtering out any interactions older than some present amount of time in the past (e.g., any interaction older than one day). In some example embodiments, however, the elimination of older interactions may be performed in a more customized manner, such as by having different present amounts of time in the past for different industries, users, groups or the like.

As an example of truncation, assume the same interaction is seen between services A and B and times t1, t2, and t3. In an example embodiment, only the last time (t3) the interaction is seen is recorded. It can then be assumed that the user only cares to know about interactions that happened in a certain time window (e.g., within the past day). If t3 is within that time window, the interaction A→B may be recorded in the graph. If t3 is not within that time window, then the interaction A→B is not recorded in the graph.

In some example embodiments, machine learning techniques may be utilized to augment the above processes. Specifically, a machine learning model may be trained by a machine learning algorithm to output time periods (e.g., preset amounts of time in the past) based on data about the interactions/services involved. Specifically, training data such as prior interaction data as well as how the interaction data was utilized by software developers in the past may be gathered. In some example embodiments this training data may be transformed, such as through normalization, filtering, or other transformation techniques, and then may be passed to a machine learning algorithm to train the machine learning model. At runtime, data about the interaction, including, for example, the software developer who developed the service(s) impacted by the interaction, the industry of the service(s), the type of interaction, location of the interactions, etc., may be fed as features to the machine learning model to produce the output time periods.

The machine learning algorithm may iterate among various weights that will be multiplied by various input variables and evaluate a loss function at each iteration, until the loss function is minimized, at which stage the weights for that stage are learned. The past training data may include manually labeled data. Specifically, the weights are multiplied by the input variables as part of a weighted sum operation, and the weighted sum operation is used by the loss function.

The machine-learning algorithm may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The machine-learned models can also be retrained by passing new training data, some of which may have been labeled via user feedback, to the machine-learning algorithm at a later time.

Regardless of whether machine learning techniques to aid in the graph truncation are utilized or not, the truncated graph may then be used to determine which lines of interaction data from the interaction log 104 are actually parsed by the log parser 200. Thus, for example, an interaction log may have 5 lines of interaction data, with each line containing 100 values for various variables. The truncated graph may indicate that only 3 of these lines are relevant, and thus only those 3 lines are parsed, and the log parser 200 may extract values for only 50 of the 100 variables since the other 50 are not relevant variables for violation detection. The result is that rather than having 5 lines of interaction data with each line containing 100 values for various variables, the parsed data includes only 50 values for each of 3 interactions.

The parsed interaction data may then be compared with one or more rules by the rules handler 202. Each rule may specify a host type of hosts that the service can communicate with (or to). Each rule may have a first list of host types to which the service can communicate and a second list of host types that the service can receive communications from.

The following is an example of a rule file:

```
deploy:
    host_types:
        - host-type-a
    inbound_config:
        inbound_listeners:
            - consul_service: service-a
              allowed_clients:
                  - host_type: host-type-b
                  - host_type: host-type-c
              enable_outbound_services: true
              outbound_services:
                  - service_name: service-b
                    mtls-authorities:
                        - host-type-b
```

If the rules handler 202 determines that a rule has been violated, this violation is passed to the reporter 204, which reports the rule violation to the software developer and provides the user with an ability to automatically "fix" the rule to accommodate the violation in the future. In some example embodiments, this ability may be provided in the form of a graphical user interface button that the user may select to request the automatic fix of the rule. If the user so selects this button, then the rules handler 202 then determines the precise command to implement to alter the rule to accommodate the violation in the future. The following is an example of how the user interface could display this automatic fix to the software developer in a graphical user interface:

One or more of the interactions between your services violate Henson configurations. Please run 'pay graph:suggest-fix' to see what you should do When the software developer then runs 'pay graph:suggest-fix," the one or more affected rules may then be automatically modified to allow the interaction that was found to have been in violation. In an alternative embodiment, the software developer may be presented with the actual modifications to the one or more rules that are needed to allow the interaction that was found to have been in violation, such as the following:

```
We found the following interactions between DEF services that
are currently not allowed in QA or production.
    - bapi-srv -> service-a
You can make these interactions allowable in QA and production
by applying the following changes below.
Use pay graph:apply-fix to do this automatically.
File: /pay/src/pay-server/henson/services/bapi-srv.yaml
--- /pay/src/pay-server/henson/services/bapi-
srv.yaml              2022-04-27 17:42:20.220979186 +0000
+++ /pay/src/pay-server/tmp/service-graph-
manager/_pay_src_pay-server_henson_services_bapi-
srv.yaml.tmp          2022-04-27 17:44:19.340169877 +0000
 . . .
+ outbound_services:
+  - service_name: service-a
+    mtls_authorities:
+     - host-type-a
File: /pay/src/zoolander/henson/services/service-a.yaml
--- /pay/src/zoolander/henson/services/service-
a.yaml                2022-04-27 17:43:48.326007728 +0000
+++ /pay/src/pay-server/tmp/service-graph-
manager/_pay_src_zoolander_henson_services_service-
a.yaml.tmp            2022-04-27 17:44:19.340169877 +0000
@@ -8,3 +8,6 @@
 inbound_config:
   inbound_listeners:
    - consul_service: service-a
+     allowed_clients:
+      - host_type: apibox
+ outbound_services: [ ]
```

Figure 3:
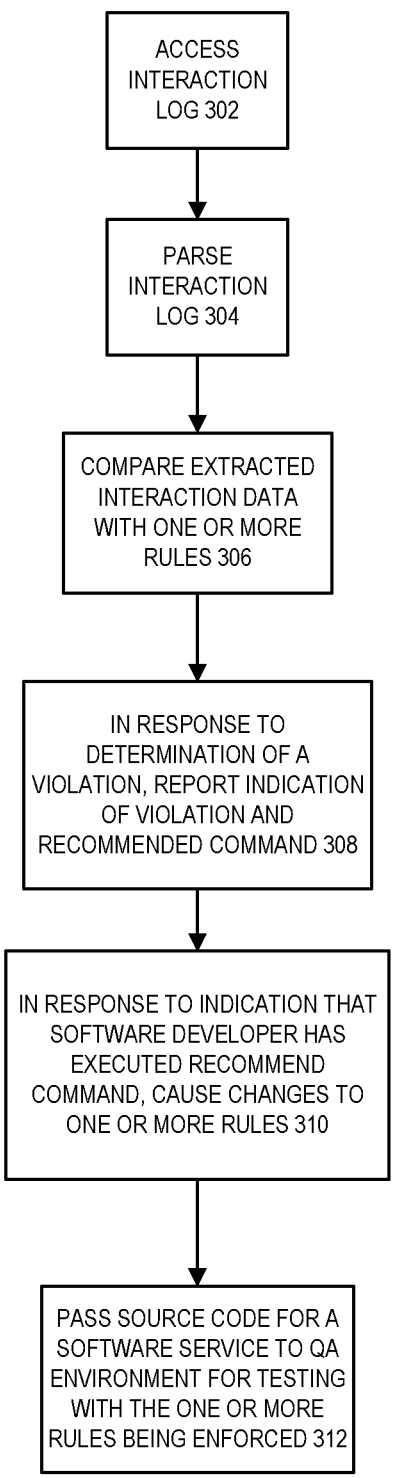
FIG. 3 is a flow diagram illustrating a method of testing interaction data in a development environment in accordance with some example embodiments.

FIG. 3 is a flow diagram illustrating a method 300 of testing interaction data in a development environment in accordance with an example embodiment. At operation 302, an interaction log is accessed. The interaction log contains data pertaining to interactions among software services in a computer system. At operation 304, the interaction log is parsed to extract interaction data. At operation 306, the extracted interaction data is compared to one or more rules defined for one or more of the software services. Each rule includes a first list of one or more hosts a corresponding software service is permitted to send communications to and a second list of one or more hosts the corresponding software service is permitted to receive communications from.

At operation 308, in response to a determination that the extracted interaction data indicates that one or more of the interactions violated one or more of the one or more rules defined for one or more of the software services, an indication of the violation with a recommended command the software developer can execute to modify the one or more rules to permit an interaction corresponding to the violation are reported to a software developer via a graphical user interface.

At operation 310, in response to an indication that the software developer has executed the recommended command, changes are caused to the one or more rules so that the interaction corresponding to the violation will not violate the one or more rules in subsequent executions of the method. At operation 312, at some subsequent time, later, source code for a first software service of the one or more of the software services is passed to a quality assurance environment for testing with the one or more rules being enforced.

Figure 4:
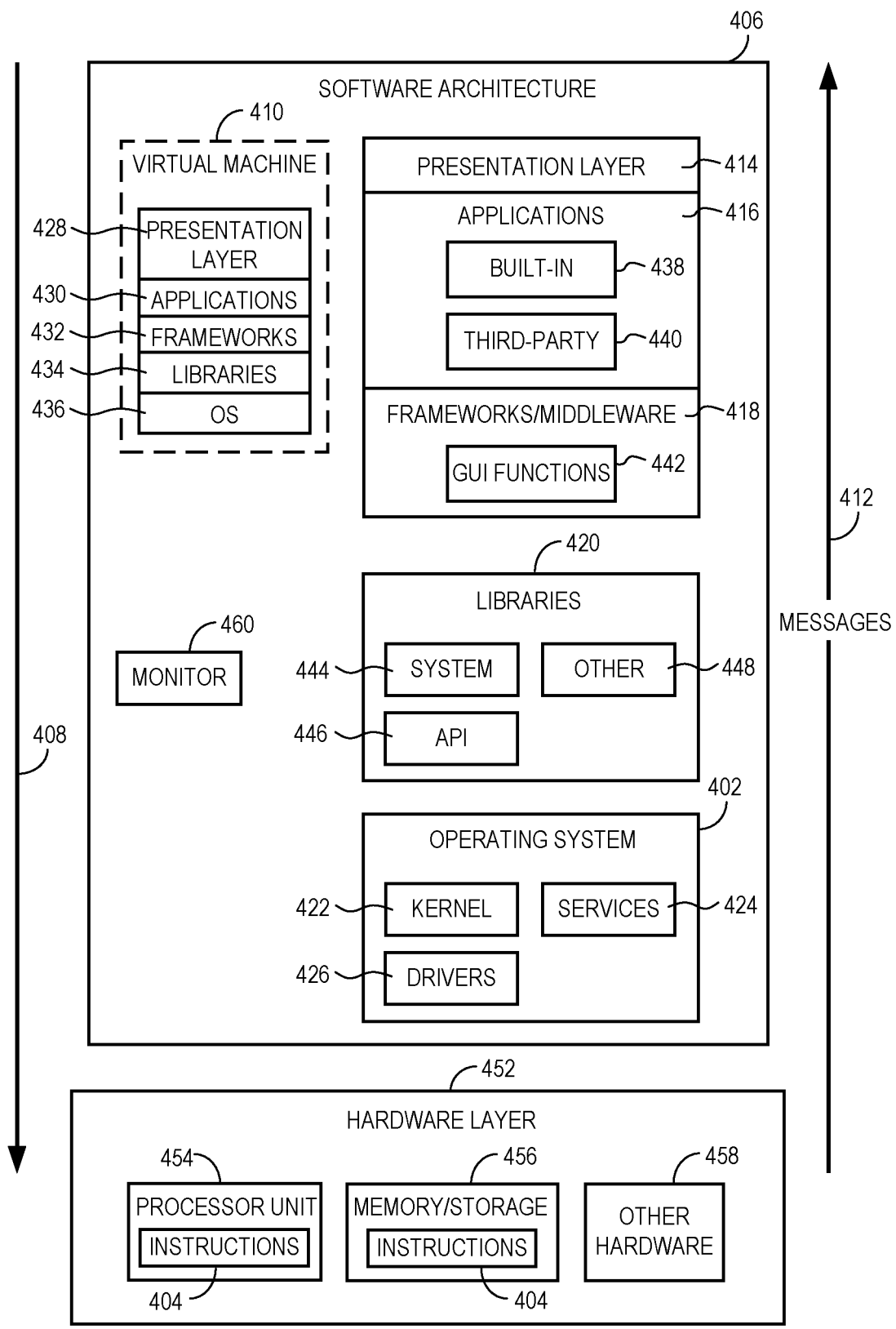
FIG. 4 is a block diagram illustrating an example software architecture, which may be used in conjunction with various hardware architectures herein described.

FIG. 4 is a block diagram illustrating an example software architecture 406, which may be used in conjunction with various hardware architectures herein described. FIG. 4 is a non-limiting example of a software architecture 406, and it will be appreciated that many other architectures may be implemented to facilitate the functionality described herein. The software architecture 406 may execute on hardware such as a machine 500 of FIG. 5 that includes, among other things, processors 504, memory/storage 506, and input/output (I/O) components 518. A representative hardware layer 452 is illustrated and can represent, for example, the machine 500 of FIG. 5. The representative hardware layer 452 includes a processor 454 having associated executable instructions 404. The executable instructions 404 represent the executable instructions of the software architecture 406, including implementation of the methods, components, and so forth described herein. The hardware layer 452 also includes memory and/or storage modules as memory/storage 456, which also have the executable instructions 404. The hardware layer 452 may also comprise other hardware 458.

In the example architecture of FIG. 4, the software architecture 406 may be conceptualized as a stack of layers where each layer provides particular functionality. For example, the software architecture 406 may include layers such as an operating system 402, libraries 420, frameworks/middleware 418, applications 416, and a presentation layer 414. Operationally, the applications 416 and/or other components within the layers may invoke API calls 408 through the software stack and receive a response as messages 412 in response to the API calls 408. The layers illustrated are representative in nature, and not all software architectures have all layers. For example, some mobile or special-purpose operating systems may not provide a frameworks/middleware 418, while others may provide such a layer. Other software architectures may include additional or different layers.

The operating system 402 may manage hardware resources and provide common services. The operating system 402 may include, for example, a kernel 422, services 424, and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 420 provide a common infrastructure that is used by the applications 416 and/or other components and/or layers. The libraries 420 provide functionality that allows other software components to perform tasks in an easier fashion than by interfacing directly with the underlying operating system 402 functionality (e.g., kernel 422, services 424, and/or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 4D graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/modules.

The frameworks/middleware 418 provide a higher-level common infrastructure that may be used by the applications 416 and/or other software components/modules. For example, the frameworks/middleware 418 may provide various graphic user interface (GUI) functions 442, high-level resource management, high-level location services, and so forth. The frameworks/middleware 418 may provide a broad spectrum of other APIs that may be utilized by the applications 416 and/or other software components/modules, some of which may be specific to a particular operating system or platform.

The applications 416 include built-in applications 438 and/or third-party applications 440. Examples of representative built-in applications 438 may include, but are not limited to, a contacts application, a browser application, a book reader application, a location application, a media application, a messaging application, and/or a game application. The third-party applications 440 may include any application developed using the ANDROID™ or IOS™ software development kit (SDK) by an entity other than the vendor of the particular platform and may be mobile software running on a mobile operating system such as IOS™ ANDROID™, WINDOWS® Phone, or other mobile operating systems. The third-party applications 440 may invoke the API calls 408 provided by the mobile operating system (such as the operating system 402) to facilitate functionality described herein.

The applications 416 may use built-in operating system functions (e.g., kernel 422, services 424, and/or drivers 426), libraries 420, and frameworks/middleware 418 to create user interfaces to interact with users of the system. Alternatively, or additionally, in some systems, interactions with a user may occur through a presentation layer, such as the presentation layer 414. In these systems, the application/component "logic" can be separated from the aspects of the application/component that interact with a user.

Some software architectures use virtual machines. In the example of FIG. 4, this is illustrated by a virtual machine 410. The virtual machine 410 creates a software environment where applications/components can execute as if they were executing on a hardware machine (such as the machine 500 of FIG. 5, for example). The virtual machine 410 is hosted by a host operating system (e.g., the operating system 402 in FIG. 4) and typically, although not always, has a virtual machine monitor 460, which manages the operation of the virtual machine 410 as well as the interface with the host operating system (e.g., the operating system 402). A software architecture executes within the virtual machine 410 such as an operating system (OS) 436, libraries 434, frameworks 432, applications 430, and/or a presentation layer 428. These layers of software architecture executing within the virtual machine 410 can be the same as corresponding layers previously described or may be different.

Figure 5:
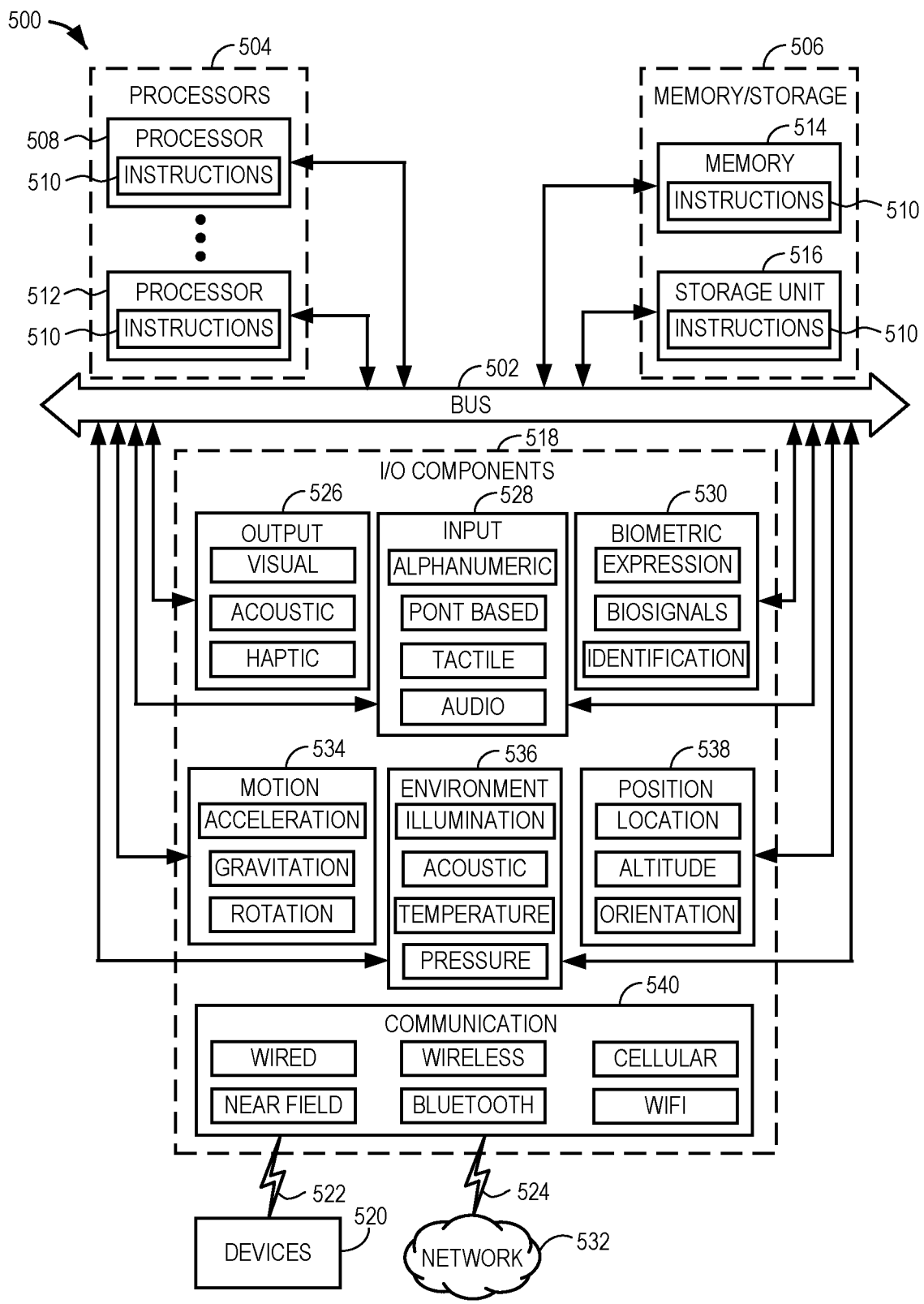
FIG. 5 is a block diagram illustrating components of a machine, according to some example embodiments, that is able to read instructions from a machine-readable medium (e.g., a machine-readable storage medium) and perform any one or more of the methodologies discussed herein.

FIG. 5 is a block diagram illustrating components of a machine 500, according to some example embodiments, that is able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed. As such, the instructions 510 may be used to implement modules or components described herein. The instructions 510 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein.

The machine 500 may include processors 504 (including processors 508 and 512), memory/storage 506, and I/O components 518, which may be configured to communicate with each other such as via a bus 502. The memory/storage 506 may include a memory 514, such as a main memory or other memory storage, and a storage unit 516, both accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500. Accordingly, the memory 514, the storage unit 516, and the memory of the processors 504 are examples of machine-readable media.

The I/O components 518 may include a wide variety of components to receive input, provide output, produce output, transmit information, exchange information, capture measurements, and so on. The specific I/O components 518 that are included in a particular machine will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion; the grouping is in no way limiting. In various example embodiments, the I/O components 518 may include output components 526 and input components 528. The output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 518 may include biometric components 530, motion components 534, environment components 536, or position components 538, among a wide array of other components. For example, the biometric components 530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 may include acceleration sensor components (e.g., accelerometer), gravitation sensor components, rotation sensor components (e.g., gyroscope), and so forth. The environment components 536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 538 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 532 or devices 520 via a coupling 524 and a coupling 522, respectively. For example, the communication components 540 may include a network interface component or other suitable device to interface with the network 532. In further examples, the communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 520 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geo-location, location via Wi-Fi® signal triangulation, location via detecting an NFC beacon signal that may indicate a particular location, and so forth.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" is a company (often a third party) appointed to handle payment card (e.g., credit card, debit card) transactions. They have connections to various card networks and supply validation and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2022, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    accessing, by one or more processors operating in a software development environment, an interaction log, the interaction log containing data pertaining to interactions among software services in a computer system;
    constructing, by the one or more processors, a graph containing a node for each of the software services and edges between nodes in the graph indicating interactions among the software services;
    generating, by the one or more processors, a reduced graph by deleting edges of the graph having a most recent occurrence older than a preset time period prior to a current time, the preset time period determined for a given software service using a first machine learning model trained based on data associated with the given software service;
    parsing, by the one or more processors operating in the software development environment, the interaction log to extract interaction data of interactions selected based on the reduced graph;
    comparing, by the one or more processors operating in the software development environment, the extracted interaction data to one or more rules defined for each of one or more of the software services, each rule including a first list of one or more hosts a corresponding software service is permitted to send communications to and a second list of one or more hosts from which the corresponding software service is permitted to receive communications; and
    in response to a determination that the extracted interaction data indicates that one or more of the interactions violated at least one rule of the one or more rules defined for a first software service of the software services, modifying, by the one or more processors operating in the software development environment, the at least one rule to permit an interaction corresponding to the violation; and
    provisioning, by the one or more processors operating in the software development environment, source code of the first software service and the modified at least one rule to a software quality assurance environment,
        wherein, operating in the software quality assurance environment, the one or more processors execute the source code of the first software service using the modified at least one rule to allow the one or more interactions that violated the at least one rule in the software development environment.

2. The method of claim 1, further comprising:
    testing, in the software development environment, operation of the first software service without enforcing the one or more rules; and
    testing, in the software quality assurance environment, operation of the first software service with enforcing the one or more rules.

3. The method of claim 1, comprising reducing a size of the graph by deleting all occurrences of a particular interaction type between a particular pair of software services except for a most recent occurrence.

4. The method of claim 1, further comprising:
    training the first machine learning model to output the preset time period for the given software service based on the data associated with the given software service.

5. A system comprising:
    one or more processors;
    a service graph manager in a software development environment, the service graph manager comprising a log parser, a rule handler, and a reporter; and
    at least one memory storing instructions that, when executed by at least one processor among the one or more processors, cause the at least one processor to perform operations comprising:
    accessing, in the software development environment, by the log parser, an interaction log, the interaction log containing data pertaining to interactions among software services in a computer system;
    constructing a graph containing a node for each of the software services and edges between nodes in the graph indicating interactions among the software services;
    generating a reduced graph by deleting edges of the graph having a most recent occurrence older than a preset time period prior to a current time, the preset time period determined for a given software service using a first machine learning model trained based on data associated with the given software service;
    parsing, by the log parser and operating in the software development environment, the interaction log to extract interaction data of interactions selected based on the reduced graph;
    comparing, by the rule handler and operating in the software development environment, the extracted interaction data to one or more rules defined for one or more of the software services, each rule including a first list of one or more hosts a corresponding software service is permitted to send communications to and a second list of one or more hosts the corresponding software service is permitted to receive communications from; and
    in response to a determination that the extracted interaction data indicates that one or more of the interactions violated at least one rule of the one or more rules for a first software service of the software services, modifying, by the rule handler and operating in the software development environment the at least one rule to permit an interaction corresponding to the violation; and
    provisioning, by the one or more processors operating in the software development environment, source code of the first software service and the modified at least one rule to a software quality assurance environment,
        wherein, operating in the software quality assurance environment, the one or more processors execute the source code of the first software service using the modified at least one rule to allow the one or more interactions that violated the at least one rule in the software development environment.

6. The system of claim 5, wherein the operations further comprise:
testing, in the software development environment, operation of the first software service without enforcing the one or more rules; and
testing, in the software quality assurance environment, operation of the first software service with enforcing the one or more rules.

7. The system of claim 5, wherein the operations comprise reducing a size of the graph by deleting all occurrences of a particular interaction type between a particular pair of software services except for a most recent occurrence.

8. The system of claim 5, wherein the operations further comprise:
training the first machine learning model to output the preset time period for the given software service based on the data associated with about the given software service.

9. A non-transitory machine-readable medium comprising instructions which, when read by a machine, cause the machine to perform operations comprising:
accessing, in a software development environment, an interaction log, the interaction log containing data pertaining to interactions among software services in a computer system;
constructing a graph containing a node for each of the software services and edges between nodes in the graph indicating interactions among the software services;
generating a reduced graph by deleting edges of the graph having a most recent occurrence older than a preset time period prior to a current time, the preset time period determined for a given software service using a first machine learning model trained based on data associated with the given software service;
parsing, in the software development environment, the interaction log to extract interaction data of interactions selected based on the reduced graph;
comparing, in the software development environment, the extracted interaction data to one or more rules defined for each of one or more of the software services, each rule including a first list of one or more hosts a corresponding software service is permitted to send communications to and a second list of one or more hosts the corresponding software service is permitted to receive communications from; and
in response to a determination that the extracted interaction data indicates that one or more of the interactions violated at least one rule of the one or more rules defined for a first software service of the software services, modifying, in the software development environment, the at least one rule to permit an interaction corresponding to the violation; and
provisioning, in the software development environment, source code of the first software service and the modified at least one rule to a software quality assurance environment,
wherein, operating in the software quality assurance environment, the machine reads the instructions to execute the source code of the first software service using the modified at least one rule to allow the one or more interactions that violated the at least one rule in the software development environment.

10. The non-transitory machine-readable medium of claim 9, wherein the operations further comprise:
testing, in the software development environment, operation of the first software service without enforcing the one or more rules; and
testing, in the software quality assurance environment, operation of the first software service with enforcing the one or more rules.

* * * * *